(12) United States Patent  (10) Patent No.: US 7,405,388 B2
Reilley  (45) Date of Patent: Jul. 29, 2008

(54) VIDEO CENTERSCOPE FOR MACHINE ALIGNMENT

(76) Inventor: Peter V. Reilley, 20 King Arthur Dr., Londonderry, NH (US) 03053

( * ) Notice: Subject to any disclaimer, the term of this patent is extended or adjusted under 35 U.S.C. 154(b) by 740 days.

(21) Appl. No.: 11/062,913

(22) Filed: Feb. 22, 2005

(65) Prior Publication Data

US 2006/0188127 A1  Aug. 24, 2006

(51) Int. Cl.
*H01J 40/14* (2006.01)

(52) U.S. Cl. ............ 250/221; 250/559.3; 356/399

(58) Field of Classification Search .......... 250/221, 250/222.1, 201.6, 201.8, 559.07, 559.3; 356/153, 356/623, 399, 400; 33/286; 382/151–152
See application file for complete search history.

(56) References Cited

U.S. PATENT DOCUMENTS

| 1,984,864 | A | 12/1934 | Cole et al. |
| 2,994,131 | A | 8/1961 | Gaylord |
| 6,677,575 | B2 | 1/2004 | Müller |
| 6,810,156 | B1 | 10/2004 | Itoh |
| 2007/0068020 | A1* | 3/2007 | Adrian .................. 33/286 |

* cited by examiner

*Primary Examiner*—Kevin Pyo

(57) ABSTRACT

This invention can be attached to the head of a milling machine and performs the functions of a center scope and an edge finder. Unlike a center scope or an edge finder it does not have to be removed from the machine before the machine is used. The invention performs this function by processing images from two cameras that are shot from off axis vantage points. The two images are processed to create a synthetic image that appears to be shot from the on axis vantage point. The processor adds a cross hair to the image to indicate that point on the workpiece that is exactly at the center axis of the quill. This allows the machine operator to exactly position the spindle precisely over a target point on the workpiece in a convent and safe manner.

16 Claims, 5 Drawing Sheets

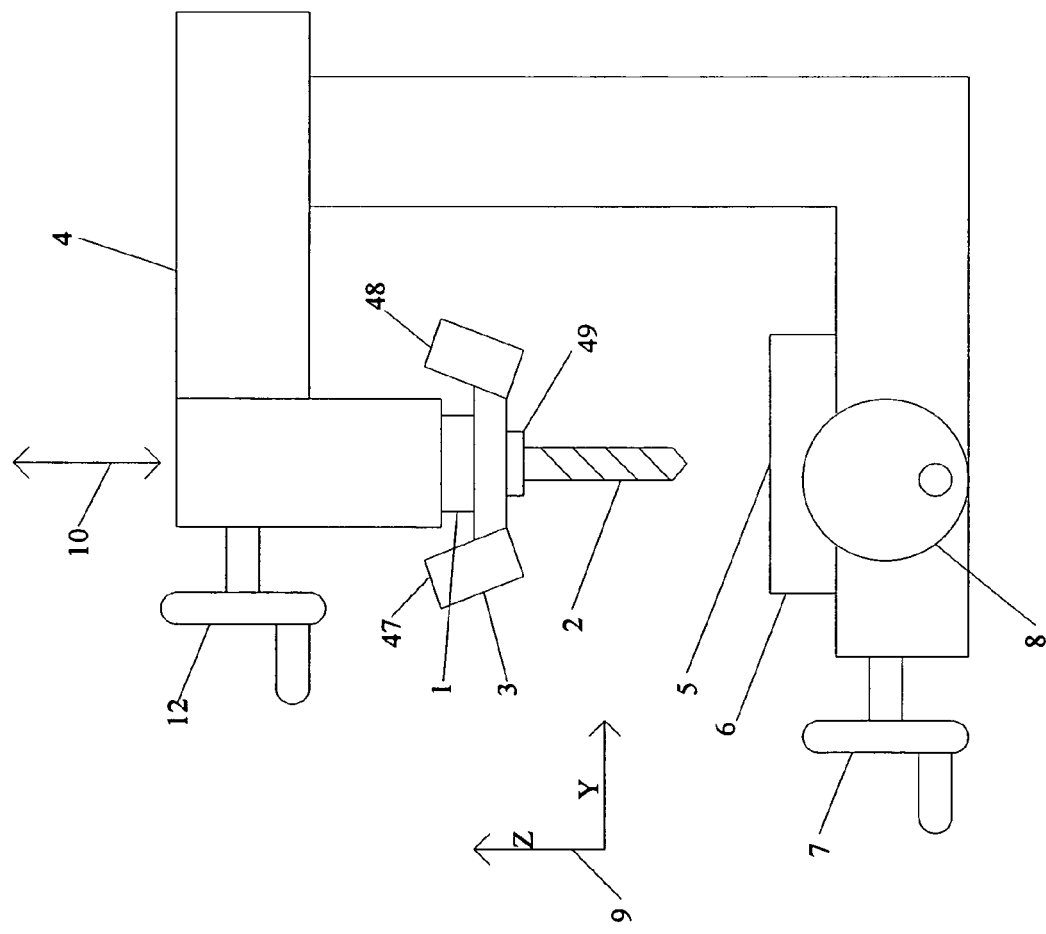

VIDEO CENTERSCOPE FOR MACHINE ALIGNMENT

CROSS-REFERENCE TO RELATED APPLICATIONS

Not Applicable.

FEDERALLY SPONSORED RESEARCH

Not Applicable.

SEQUENCE LISTING OR PROGRAM

Not Applicable.

BACKGROUND OF THE INVENTION

1. Field of Invention

This invention relates to the field of instruments for machine tool setup and calibration.

2. Prior Art

A common task facing a machinist is the alignment of a cutting tool with the workpiece. A number of tools have been developed to aid in this task. They range from simple rulers to precision instruments such as dial indicators and center scopes.

One useful tool used with milling machines is the edge finder as described by Cole et al in U.S. Pat. No. 1,984,864. This is a simple tool that is mounted in the quill and slowly brought into contact with the edge of the workpiece while the spindle is rotating. The spring loaded end of the edge finder will indicate when the edge is in alignment with the quill.

Another useful tool is the coaxial indicator. This is used to align the quill over the center of an existing hole. It is a specialized dial indicator that mounts in the quill and has a long feeler arm. As the spindle is rotated by hand the feeler arm rotates around the inner surface of the hole and will show any misalignment.

A centerscope is a specialized type of microscope had been adapted for machine tool use. It uses similar optics to a microscope but has a mirror in the optical path allowing the body to have a bend. The objective lens is vertical, in line with the quill axis, but the eyepiece is off to the side at an angle. This arrangement allows the machinist to see where the quill center line intersects with the surface of the workpiece. When the centerscope is removed from the quill and the cutting tool mounted, the cutting tool will be exactly aligned with the workpiece.

3. Objects and Advantages

Most of the current alignment methods require that the tool be removed from the spindle. This is time consuming and disruptive of work flow. Some of these methods only work for edges and not for scribed lines. They all require that the machine be shut down. All of these devices require the machine operator to work in close proximity to the spindle thereby increasing the risk of injury.

The present invention solves the problem with other alignment methods.

The advantages to the present invention are;
(a) Does not need to be removed while machine is operating.
(b) Magnifies the image of the workpiece resulting in better alignment.
(c) No moving parts.
(d) Safer, can be used remotely.
(e) Changing tools does not affect the calibration.
(f) Easily removed.
(g) Easily calibrated.

The invention combines these features in a way that provides significant advantages over other means of machine tool alignment.

SUMMARY

This invention can be attached to the head of a milling machine and performs the functions of a center scope and an edge finder. Unlike a center scope or an edge finder it does not have to be removed before the machine is used to cut metal. The invention performs this function by processing images from two cameras that are shot from off axis vantage points. The two images are processed to create a synthetic image that appears to be shot from the on axis vantage point. The processor adds a cross hair target designator to the image to indicate that point on the workpiece that is exactly at the center axis of the quill. This allows the machine operator to exactly position the spindle precisely over a target point on the workpiece in a convent and safe manner.

DRAWINGS—FIGURES

FIG. 1 shows a side view of a milling machine that has the invention attached to the quill.

FIG. 2 shows a top view of an example workpiece.

FIG. 6 shows the geometric construction of the invention.

DRAWINGS—REFERENCE NUMERALS

Figure 3:
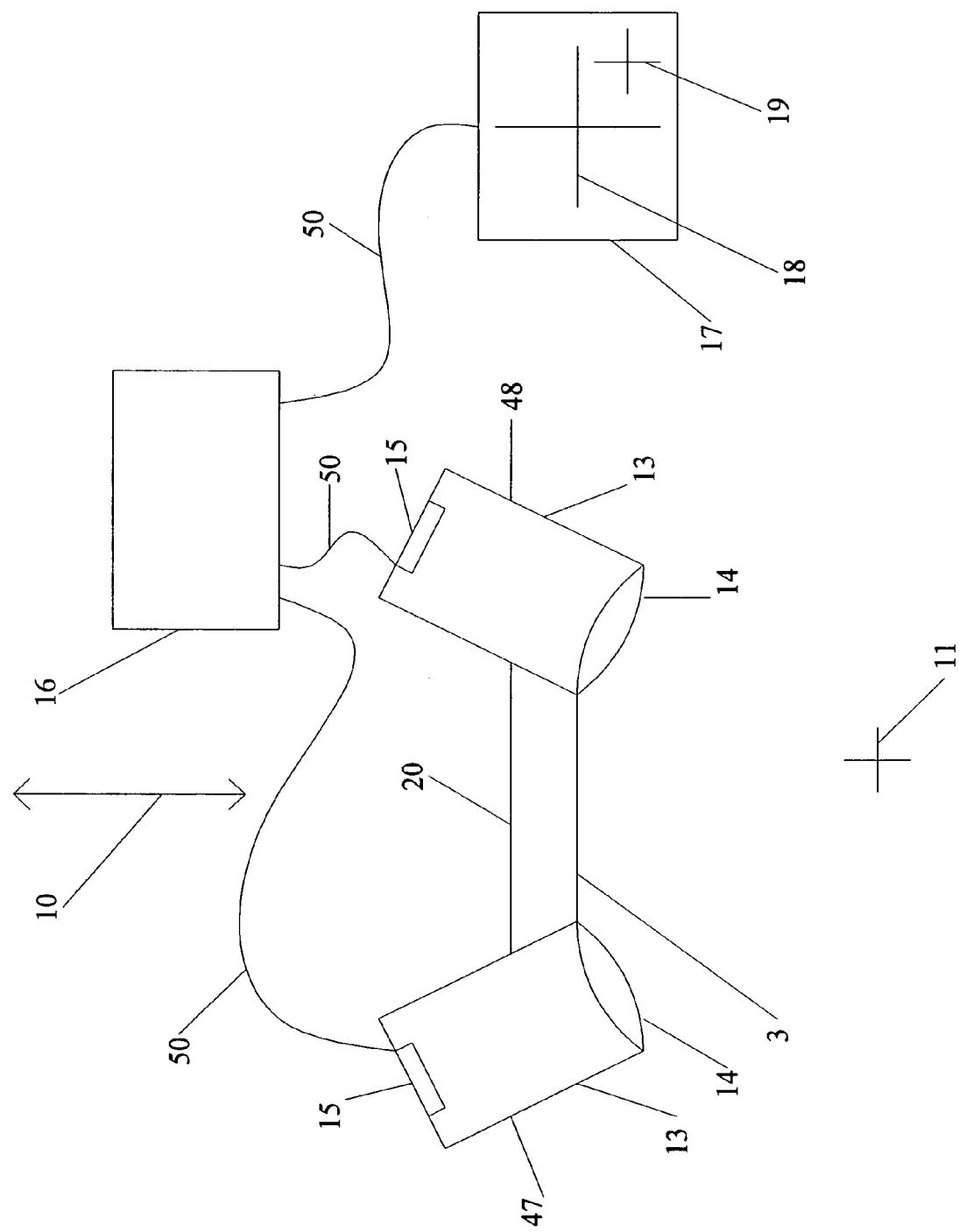
FIG. 3 shows a detailed view of the invention.

Ref 1 The quill.
Ref 2 The cutting tool.
Ref 3 The video centerscope machine alignment device.
Ref 4 The milling machine.
Ref 5 The target point on the workpiece.
Ref 6 The workpiece.
Ref 7 Operator crank for the Y axis.
Ref 8 Operator crank for the X axis.
Ref 9 Graphic showing orientation of Y and X axes.
Ref 10 Line shows the machine axis.
Ref 11 These are the scribed lines indicating the target point.
Ref 12 Operator crank for the Z axis.
Ref 13 Camera body.
Ref 14 Lens.
Ref 15 Image sensor.
Ref 16 Image processor.
Ref 17 Display screen.
Ref 18 Computer generated target designator graphic.
Ref 19 The scribed lines as displayed on the screen.
Ref 20 Mounting bracket.
Ref 21 Laser.
Ref 22 Laser beam.
Ref 23 Spot where the laser beam hits the workpiece.
Ref 24 The spot where the laser beam hits the workpiece as displayed on the screen.
Ref 25 Geometric representation of the centerscope.
Ref 26 Line showing the orientation of the machine axis.
Ref 27 Offset for left camera.
Ref 28 Offset for right camera.

Ref 29 Angle for left camera.
Ref 30 Angle for right camera.
Ref 31 Centerline of view for left camera.
Ref 32 Centerline of view for right camera.
Ref 33 Target point.
Ref 34 Target plane that is closer.
Ref 35 Target plane at the design distance.
Ref 36 Target plane that is further.
Ref 37 The optical center of the lens of the left camera.
Ref 38 The optical center of the lens of the right camera.
Ref 39 Image produced by left camera.
Ref 40 Image of scribed lines produced by left camera.
Ref 41 Offset of scribed lines between the left and right cameras.
Ref 42 Image produced by right camera.
Ref 43 Image of scribed lines produced by right camera.
Ref 44 The position of scribed lines in the Y axis produced by right camera.
Ref 45 Graphic showing orientation of X and Y axes.
Ref 46 The position of scribed lines in the Y axis produced by left camera.
Ref 47 The left camera.
Ref 48 The right camera.
Ref 49 Spindle.
Ref 50 Wires connecting various components.

DETAILED DESCRIPTION—FIGS. 1-6

FIG. 1 shows a typical milling machine 4. The machine has cranks that move the workpiece 6 along two axes. One crank handle 8 moves the workpiece 6 in the X direction. A second crank handle 7 moves the workpiece 6 in the Y direction. A third crank handle 12 moves the quill 1 in the Z direction. There is a graphic 9 that shows the direction of the Y and Z axes. The X axis direction is perpendicular to the drawing.

The quill 1 of the machine 4 holds the spindle 49 to which the cutting tool 2 is attached. The quill 1 is able to move in the Z axis but does not rotate. The quill holds the spindle 49 and the cutting tool 2 both of which do rotate. The center of rotation of the cutting tool is indicated by line 10. The center line 10 indicates the path along which the tip of the cutting tool 2 will travel. If the cutting tool 2 is brought into contact with the workpiece 6 it will touch at the target point 5. In other words the center line 10 is extended would pass through the tip of the cutting tool 2 and through the target point 5 of the workpiece 6. Line 10 is referred to as the machine axis.

The video centerscope invention 3 is attached to the quill 1. The centerscope 3 moves up and down along the Z axis with the quill. An alternate place to mount the centerscope is on the milling machine frame 4 just above the quill 1. However the preferred embodiment is to mount the centerscope 3 on the quill 1.

FIG. 2 shows the workpiece 6. This is a top view that shows a scribed mark 11. The scribed lines 11 indicate the target point 5. The machine operator wants to position the cutting tool 2 directly over the target point 5.

FIG. 3 shows the centerscope components. The centerscope comprises two cameras 13, a mounting bracket 20, an image processing computer 16, and an image display 17. Each camera 13 consists of a lens 14 an image sensor 15. Since the surface of the workpiece 6 is not perpendicular the optical axis 31 and 32 the image sensors 15 should be positioned according to the Scheimpflug rule, a well known optical effect. The image sensors 15 are connected to the image processor 16 by wires 50. The image processor 16 receives two images from the image sensors 15 and performs an image correlation on the images. The result of the image correlation is the offset value. The offset value represents the shift in the two images due to parallax. The image processor 16 creates a synthetic image based on the two received images and the offset value. The image processor then adds a cross hair 18 to the synthetic image and sends this combined image to the display device 17.

The machine operator might see the image shown on the imaging device 17. Shown is the cross hair 18 added by the processor and the scribed lines 19 that are on the workpiece 6. The machine operator could move the scribed lines 19 into alignment with the cross hair 18 by using the hand cranks for the X 8 and Y 7 axes. Thus the operator can easily align the cutting tool 2 over the target point 5 by viewing the display 17.

Figure 4:
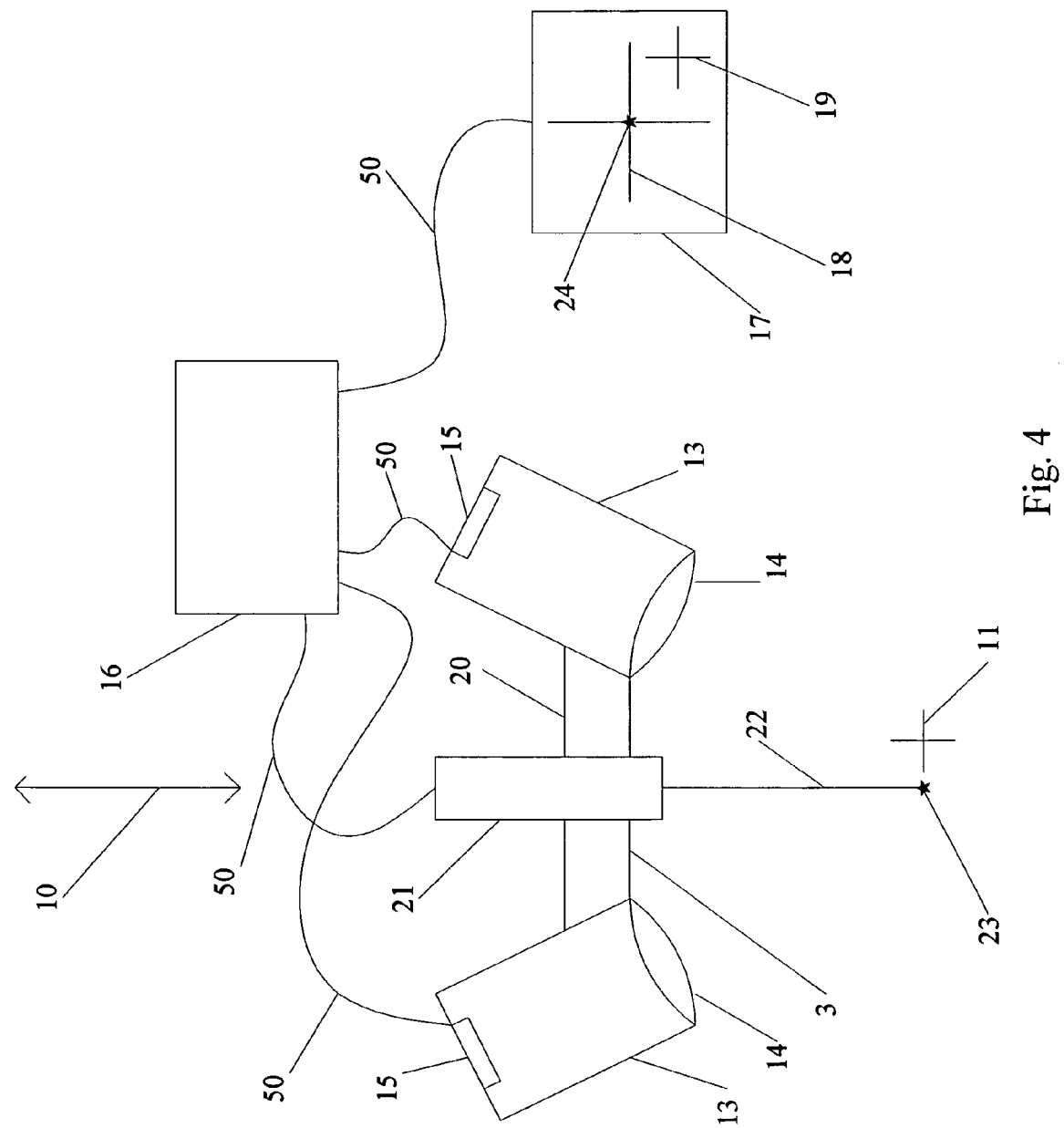
FIG. 4 shows an alternate implementation of the invention.

FIG. 4 shows an alternate implementation. The only change from the implementation of FIG. 3 is the addition of a laser 21. One of the problems with the image correlation function is that it needs visible features in the images to be successful. If there are no scribed lines 11 visible the correlation function will fail and not create a valid offset value. Without a valid offset value the synthetic image cannot be created. The laser 21 can create a spot 23 which will act as an artificial feature on the workpiece 17. The correlation function can correlate correctly based on the artificial feature 23.

Figure 5:
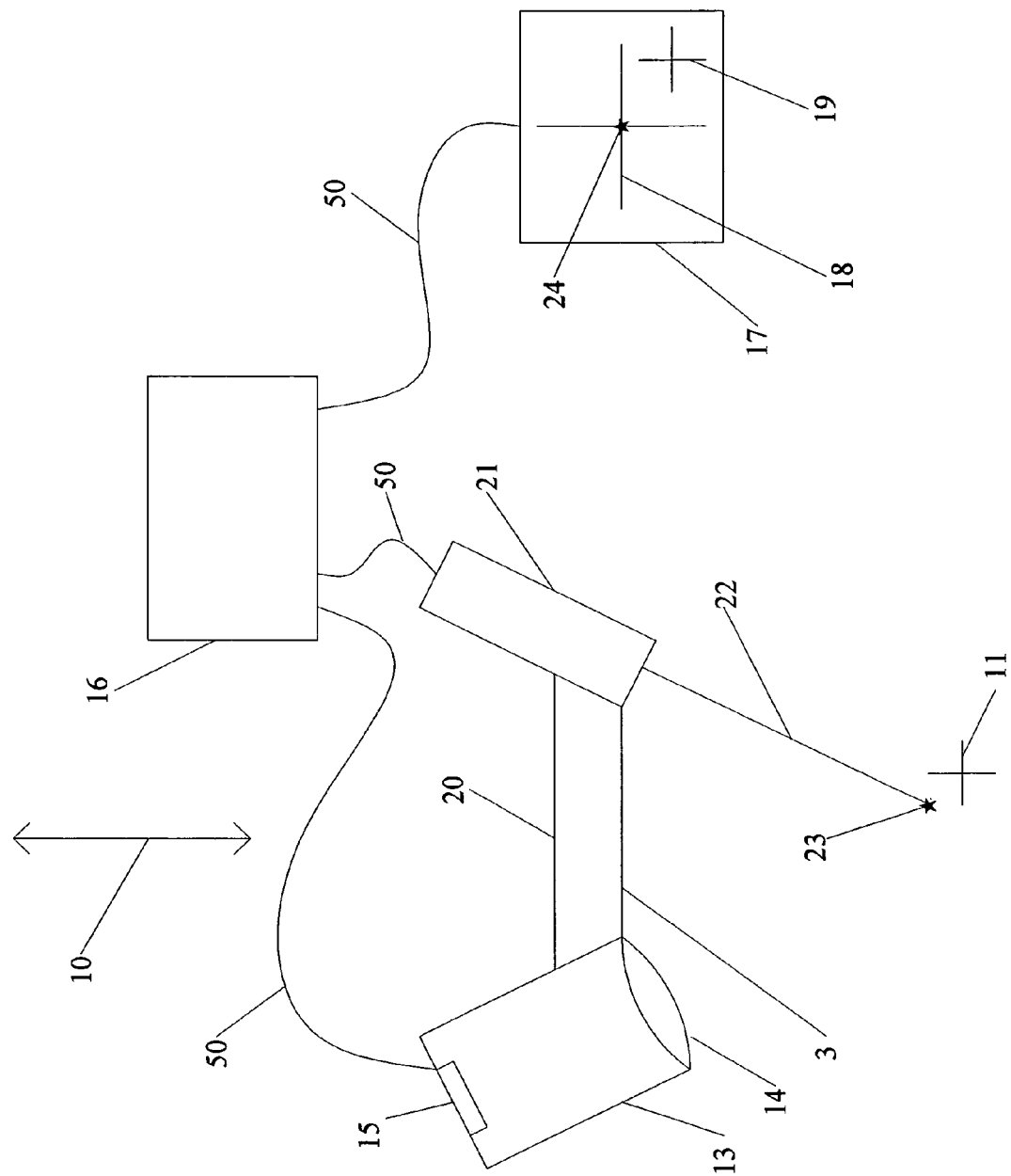
FIG. 5 shows a second alternate implementation of the invention.

FIG. 5 shows another alternate implementation. In this case the second camera is removed and replaced with a laser 21. In this implementation the image processor 16 determines the distance to the workpiece 17 using triangulation. Once the processor 17 determines the distance it can create the synthetic image and correctly position the added cross hair 18 in the combined image.

FIG. 6 shows a geometric representation of the cameras, the machine axis 26 and the target point 33. Line 31 represents the optical axis of the left camera. Line 32 represents the optical axis of the right camera. Line 27 is drawn between the optical centers of the lenses in the two cameras. Intersection 37 is at the optical center of the lens in the left camera. Intersection 38 is at the optical center of the lens in the right camera. Length 25 and length 28 represent the distances that the lenses are off from the machine centerline 26. In the preferred embodiment both cameras are the same distance from the machine centerline 26. Angles 29 and 30 represent the angles which the cameras are tilted so as to have the target point 33 in the center of their image. In the preferred embodiment these angles are the same.

Lines 34, 35, and 36 represent possible planes that the workpiece can be in. If the quill 1 is moved up and down the distance from the centerscope 27 to the workpiece 6 may move through planes 34, 35, or 36. Line 35 is the actual focus plane but the system's depth of focus would allow the system to be used over a range represented by lines 34 and 36. This represents the range where the correlation function would obtain a valid offset value. This size of the range is determined by focal depth of the cameras and the size of the field of view.

Figure 7:
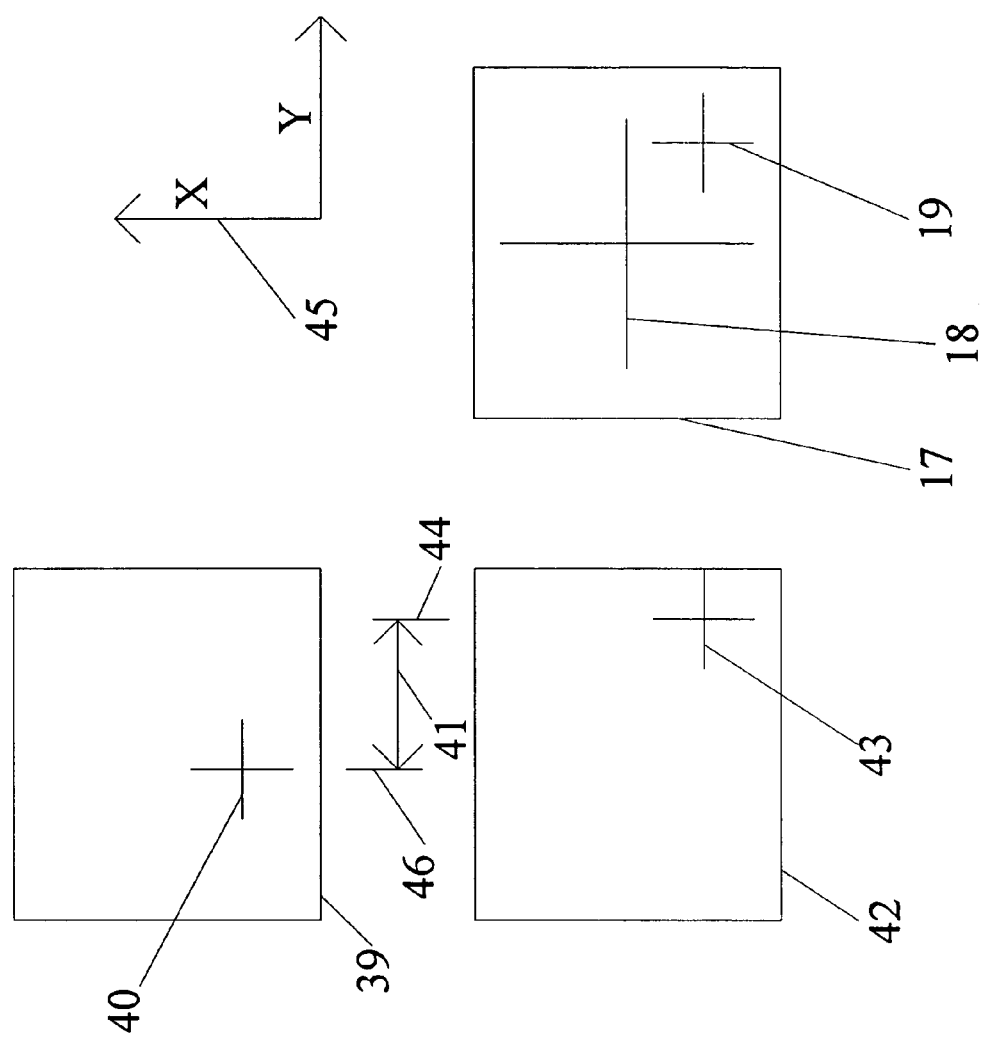
FIG. 7 shows the input images and the resulting image as viewed on the display.

FIG. 7 shows representative images that the centerscope might see. Graphic 45 shows the naming of the axes used in this figure. The left camera 47 may see an image similar to 39 that includes the scribed lines 40. The right camera 48 may see an image similar to 42 that includes the scribed lines 43. The scribed lines 40 and 43 appear to be in different positions because of parallax resulting from the two different views from the two different cameras. Line 46 indicates the position in the Y axis of the scribed lines 40 in the image from the left camera 47. Line 44 indicates the position in the Y axis of the scribed lines 43 in the image from the right camera 48. The image processor correlates the two images 39 and 42 and finds the amount of the offset 41 in the Y axis. The correlation function does not actually find the scribed lines 40 and 43 in the images 39 and 42; rather it finds amount the shift 41 between the images. The correlation function can operate on any observable feature on the workpiece not just the scribed lines. The offset represents the amount that the images must be shifted in the Y axis until they closely match.

An alternate method of obtaining the offset value is to have it input by the machine operator. The machine operator would observe a synthetic image that was not yet corrected with the offset value. The operator would use a manual control to set the offset value. As the control was adjusted the images received from the two cameras would be shifted. When the operator observed that he had shifted the two images so that they aligned he would save the offset value into memory to be used by the image processor. This is not the preferred implementation, the preferred implementation is to use an image correlation function.

The processor 16 creates a synthetic image 17 from images 39 and 42. If the geometry is symmetrical as shown in FIG. 6 then the offset 41 can be divided in half giving the image shift value. The synthetic image 17 is created by shifting image 39 right by the shift value and by shifting image 42 left by the shift value. The will make the two images 39 and 42 nearly identical. The synthetic image can be either of the two shifted images or it can be the average of the two images. Alternatively the synthetic image can be the two shifted images cut in half and positioned side by side. There are many ways to combine the two shifted images to create the synthetic image. The processor will then add a target designator graphic shown here as 18. The actual position of the graphic 18 is determined during the calibration phase. The combined image 17 now shows the target designator graphic 18 shown as a cross hair and the scribe lines 19 as they may appear on the workpiece 6.

Operation: Calibration

One embodiment provides for easy removal from the machine and therefore an alignment procedure will be necessary. The first step is to determine the actual target point. This is easily done with a sharp pointed tool, such as an engraving bit, mounted in the quill. The operator brings the tip of the tool into contact with a piece of scrap metal with the tool spinning. This should leave a very small mark on the scrap. This mark is the target point on the scrap. The axis of the machine passes through this point.

Next mount the video centerscope on the quill. Bring the quill to the position where both cameras see the mark. The correlation function should align the right and left images on the mark. Use the controls on the display to position the computer generated cross hairs over the mark on the scrap. Use the controls to save that position in memory. Move the quill up or down to another position where the mark remains visible in both cameras, position the cross hair and save the setting. Repeat this process a few times at different positions of the quill.

The calibration process is only needed when the video centerscope is first mounted on the machine. During normal use it need not be repeated except as a check.

Operation: Normal Use.

The video centerscope is very easy to use. Any object that is in the field of view of the cameras will have a cross hair placed on its image. The machine operator simply positions the workpiece such that the crosshairs appear at the place on the workpiece where he wants the machine to be aligned. If he wants to drill a hole at the intersection of two scribed lines he aligns the video crosshairs with the scribed lines. The drill is now directly over the scribed lines. He does not need to remove the video centerscope before beginning his machining operation.

It is intended that this invention can be used by a human machine operator. It is also intended that the information presented on the display could also be provided to an automated machine operator. While this description refers to the inventions' use on a machine tool it is intended that this invention apply to all uses where the ideal camera positioning is obstructed or otherwise not possible and a synthetic image is an acceptable compromise.

I claim:

1. A device for aligning a machine with a target point comprising:
    (a) two or more image sensing devices able to detect a projected image and send the image to another component, and
    (b) two or more lenses to project an image at a focal plane, and
    (c) an image processing system containing a computer, memory, and the ability to send and receive images, and
    (d) wherein said machine has an alignment axis, and
    (e) wherein said image sensing devices view said target point through said lenses thereby receiving projected images of the target point, and
    (f) wherein, the image sensing devices can send images to said image processing system, and
    (g) wherein the image processing system receives the images and determines an offset value, and
    (h) wherein the image processing system creates a synthetic image based on the received images and said offset value, and
    (i) wherein the image processing system adds a target designator to said synthetic image thereby creating a combined image, and
    (j) wherein said target designator indicates said alignment axis of said machine, and the machine operator is able to the information contained in the combined image to bring the alignment axis of the machine into the desired alignment with the target point by using the machine controls.

2. The device of claim 1 wherein there are more than one image sensing devices.

3. The device of claim 1 wherein there is a light beam projecting a pattern on the target object.

4. The device of claim 3 wherein there is one image sensing device that sends an image to said processor.

5. The device of claim 4 wherein the processor determines the offset value from said single image and said projected light pattern.

6. The device of claim 1 where the image is displayed to a machine operator on an image display device.

7. The device of claim 1 wherein the machine operator is an automatic controller.

8. The device of claim 1 wherein the machine operator is a person.

9. A method of aligning a machine with a target point comprising:
    (a) providing two or more image sensing devices able to detect a projected image and send the image to another component, and
    (b) providing two or more lenses to project an image at a focal plane, and
    (c) providing an image processor containing a computer, memory, and the ability to send and receive images, and
    (d) wherein said machine has an alignment axis, and
    (e) wherein said image sensing devices view said target point through said lenses thereby receiving projected images of the target point, and (f) wherein said image sensors send images to said image processing device, and (g) wherein the image processor receives said images and determines an offset value, and (h) wherein the image processing system creates a synthetic image based on the received images and said offset value, and (i) wherein the image processing system adds a target designator to said synthetic image thereby creating a combined image, and (j) wherein said target designator indicates the alignment axis of said machine, and the machine operator is able to use this information to bring the alignment axis of the machine into the desired alignment with the target point by using the machine controls.

10. The method of claim 9 wherein there are more than one image sensing devices.

11. The method of claim 9 wherein there is a light beam projecting a pattern on the target object.

12. The method of claim 11 wherein there is one image sensing device that sends an image to said processor.

13. The method of claim 12 wherein the processor determines the offset value from said single image and said projected light pattern.

14. The method of claim 9 where the image is displayed to a machine operator on an image display device.

15. The method of claim 9 wherein the machine operator is an automatic controller.

16. The method of claim 9 wherein the machine operator is a person.

* * * * *